July 21, 1964
C. B. CURRIE
3,141,389
SPRING ADJUSTING MEANS FOR CONTROL DEVICES
Filed Dec. 22, 1961
2 Sheets-Sheet 2
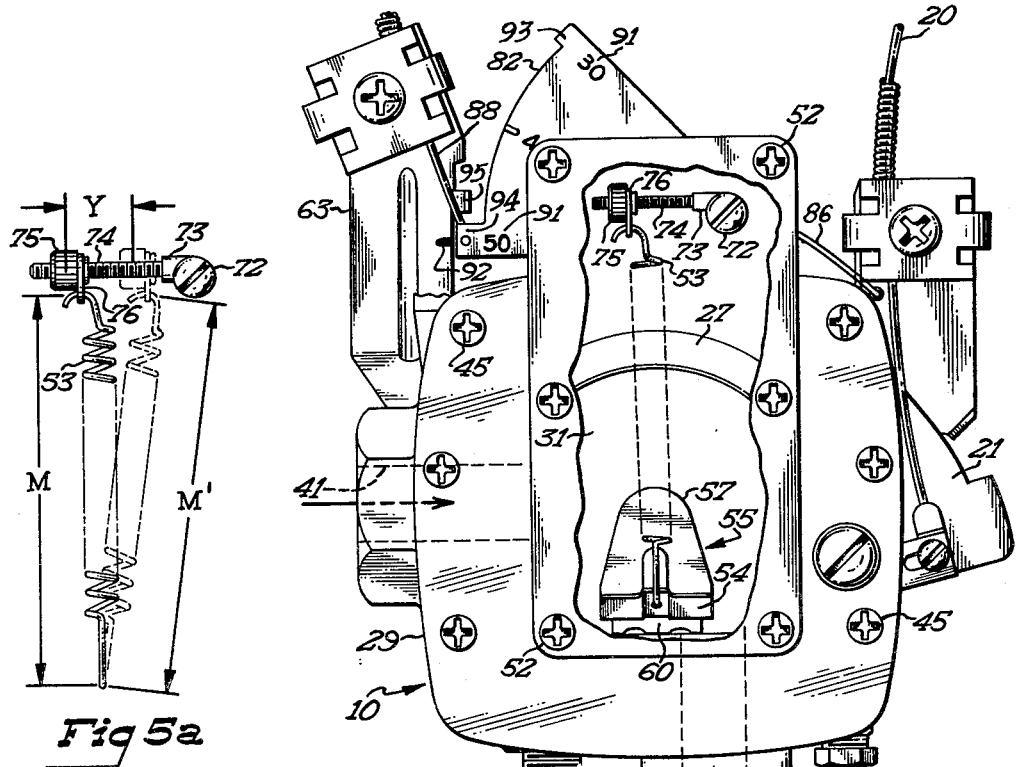
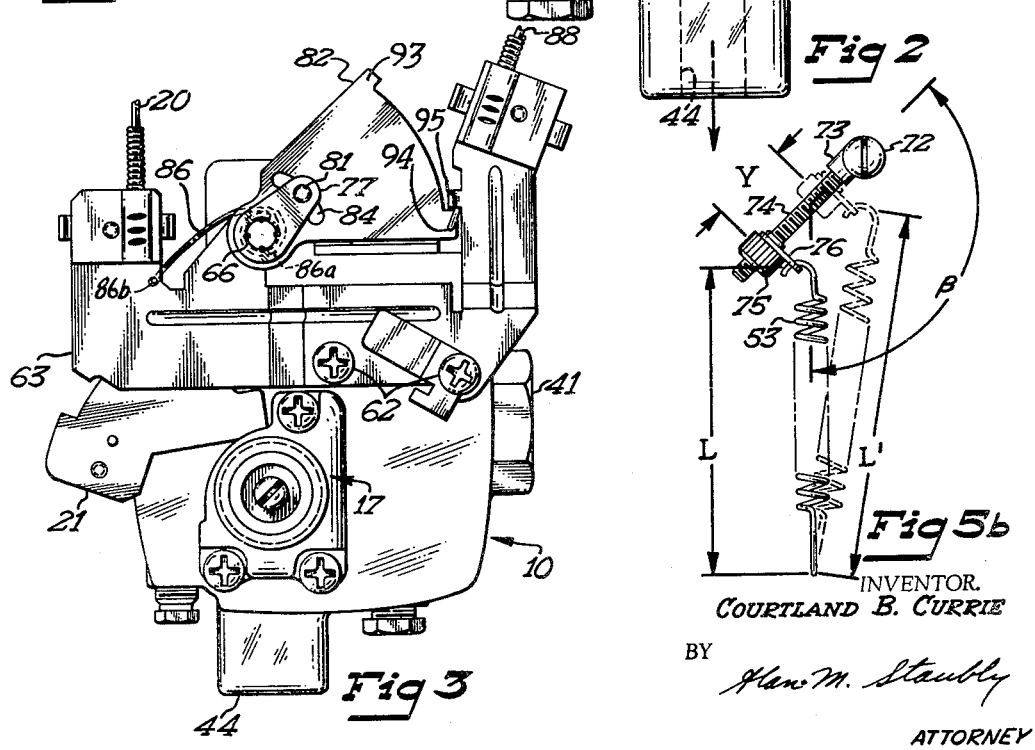
INVENTOR.
COURTLAND B. CURRIE
BY
*Han M. Staubly*
ATTORNEY

United States Patent Office 3,141,389
Patented July 21, 1964

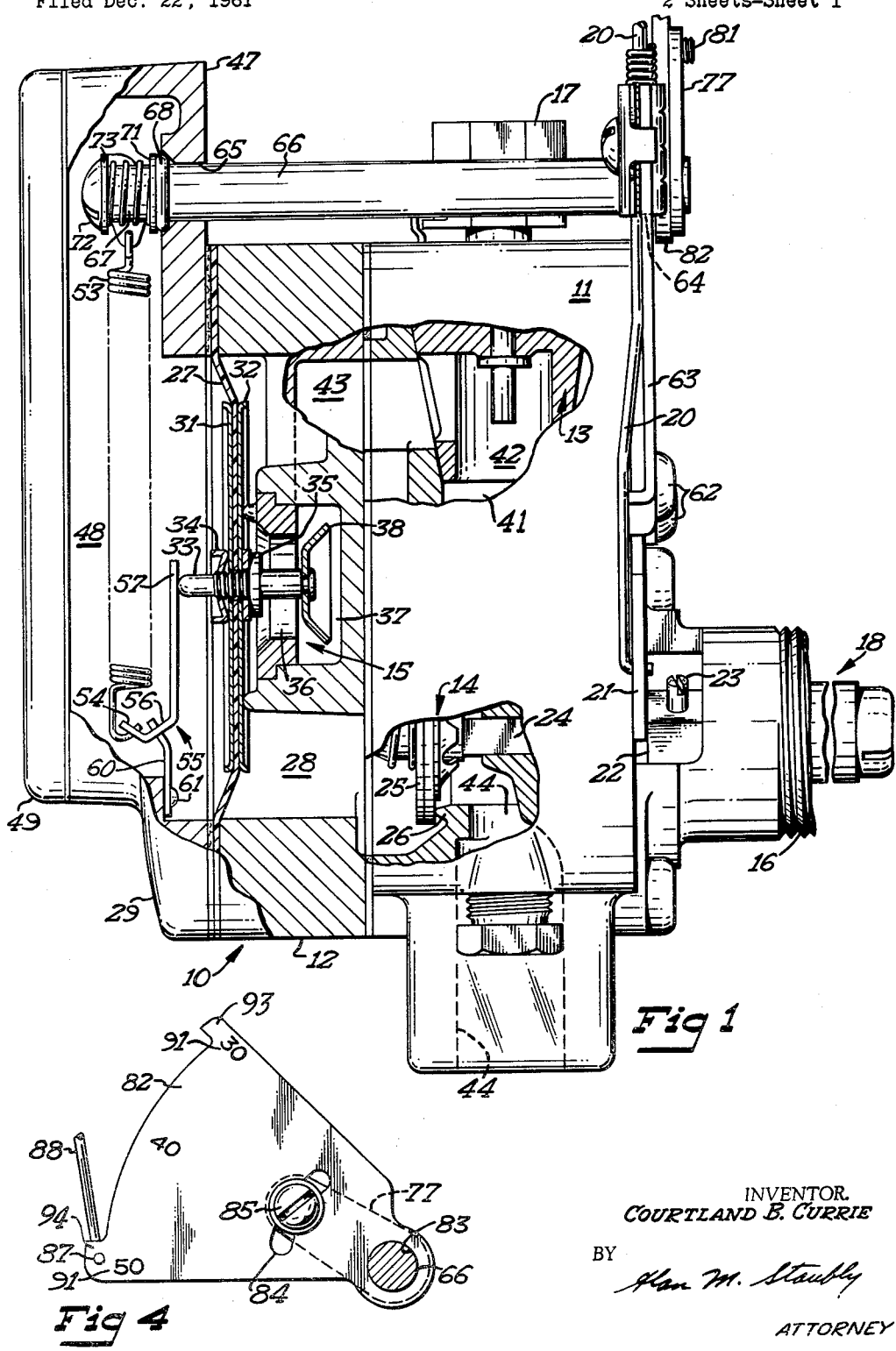

3,141,389
SPRING ADJUSTING MEANS FOR
CONTROL DEVICES
Courtland B. Currie, Long Beach, Calif., assignor to
Minneapolis-Honeywell Regulator Company, Minneapolis, Minn., a corporation of Delaware
Filed Dec. 22, 1961, Ser. No. 161,730
5 Claims. (Cl. 92—95)

This invention relates to pressure responsive control devices of the type having a diaphragm operator moveable in response to the pressure of a fluid. More particularly, this invention is directed to a novel arrangement for selectively adjusting the loading on the diaphragm operator of a pressure responsive control device from a point external of the device. It is also directed to a novel structure which facilitates rapid and easy calibration of such a device.

In pressure operated control devices wherein a diaphragm operator is used to respond to the force of a fluid under pressure, it is common to use a spring which acts on the diaphragm in opposition to the force of the fluid. In this type of device, it is also well known to have some means for adjusting the bias on the spring and to thereby determine the operating point of the control device. When the pressure of the fluid becomes great enough to overcome the force of the spring, the diaphragm is caused to be moved thereby and, in turn, moves an output member which may be used to operate some other device. In many applications, it is adequate to have a single operating point and, therefore, when the control device is installed, the bias on the spring may be adjusted and, thereafter, will require no further attention.

In many applications, however, it is desirable to have a pressure operated control device wherein the operating point of the device may be changed after the device has been installed in a system. In such an application it is desirable to provide a means whereby the operating point may be changed by the mere shifting of a selector which is located externally of the device. In this type of application it is further desirable to have some type of indicating means to indicate the point at which the device is set, so that a quick and accurate selection of the desired operating point can be made.

Control devices having these features find application in many fields, for example, where the operator is used in a fluid pressure regulator to regulate the flow of fuel to a device such as a burner supplying heat in a hot water heater. In this type of device, it is desirable that the home owner or caretaker be able to select the rate of flow of fuel through the valve, and thus the rate of heat production at the burner, which he desires. This can be accomplished by changing the loading on the diaphragm operator which in this case is responsive to the outlet pressure of the fuel flowing through the valve. When it is desired to have a high heat rate, it is necessary to have a high rate of flow of fuel through the valve. To accomplish this, the loading on the diaphragm must be adjusted so that the diaphragm valve will regulate at a higher pressure. When a lower heat rate is desired, the loading on the diaphragm must be changed so that the diaphragm valve will regulate at a somewhat lower pressure. In this type of device it is customary to have a simple selector which the home owner or caretaker may adjust to select the rate of heat production which he desires. The selector would normally be calibrated in terms of the heat rate or simply have indications reading "high," "medium" and "low."

A number of arrangements have been proposed to fulfill these requirements and several are presently commercially available. However, all of these devices have a common shortcoming in that they are extremely difficult to calibrate. For example, if a regulator valve is to be made so that a heat rate may be selected any place between a maximum and a minimum, the valve must be calibrated so that when the indicator reads a maximum rate, the tension on a diaphragm loading spring is such that it will cause the diaphragm to operate in response to a pressure which corresponds to some maximum rate of flow of fuel through the valve. Then the device must be further calibrated so that as the selector is shifted through the range of heat rates between the maximum rate and the minimum rate, the tension on the spring will at all times be such that the flow through the valve will correspond to that indicated on the selector. Such a calibration has been very difficult, if not impossible, to obtain in the arrangements heretofore proposed.

My invention provides an arrangement whereby the loading on the diaphragm operator may be selectively adjusted from a point externally of the device and also provides a means for indicating the loading on the diaphragm and means for easily calibrating the device so that an accurate indication of the loading on the diaphragm is obtained over the entire range of operating points.

Therefore an object of my invention is to provide an arrangement for easily adjusting the loading mechanism on the diaphragm operator of a pressure responsive control device.

Another object of the invention is to provide, in a pressure responsive control device, an arrangement whereby the loading on the diaphragm operator may be readily adjusted from a point external of the device while providing means for indicating the operating point of the device.

Still another object of the invention is to provide an arrangement, as previously described, which facilitates easy and rapid calibration of the device to give an accurate indication over the entire range of operation of the device.

These and other objects of the invention will become apparent upon reading the following detailed description of the invention in conjunction with the accompanying drawing wherein:

FIGURE 1 is a side view, with portions broken away, of a manifold gas valve wherein the present invention is utilized in connection with a pressure regulator to select the rate of flow of gas through the valve.

FIGURE 2 is a view of the manifold valve taken from the left of FIGURE 1 wherein a portion is broken away to better show the invention.

FIGURE 3 is a view of the manifold valve taken from the right side of FIGURE 1.

FIGURE 4 is a front view of a selector member which forms a portion of the invention.

FIGURE 5-A is a schematic view showing typical positions of a diaphragm loading spring, which forms a part of my invention, before and after calibration of the valve with the selector adjusted for a maximum flow condition.

FIGURE 5-B is a schematic view showing typical positions of the spring before and after calibration, with the selector set at a minimum flow position.

Referring to FIGURES 1, 2, and 3, the reference numeral 10 generally designates a manifold gas valve which is particularly adapted to be used in connection with a hot water heater to control the flow of fuel gas to the burner therein. Manifold valve 10, which has a body which is made up of two members 11 and 12, includes a plug valve 13 and a thermostatically controlled on-off valve 14 located in body member 11 and a pressure regulator valve 15 located in body member 12. A threaded nipple portion 16, extending from body member 11, is provided for attaching the manifold valve to the hot water heater.

Plug valve 13 is adapted to be rotated manually by knob 17 between positions completely shutting off gas to the manifold valve, a pilot lighting position, and a normal "on" position. Thermostatic valve 14 is operated by a rod and tube assembly generally shown at 18 which passes through nipple 16 and senses the temperature of the water in the heater. The temperature at which the water is to be maintained is selected by adjusting a remote selector mechanism (not shown), the movement of which is in turn transmitted through a Bowden wire 20 to a member 21 which is attached to the rod and tube assembly by a hexagonal collar 22 and a screw 23. Rod and tube assembly 18 is threaded into the valve. By adjusting the position of member 21, the effective length of the rod is varied. Movement of valve stem 24 is caused by the expansion or contraction of the tube and stem 24, which, in turn, moves a snap action valve member 25 and causes it to move relative to a seat 26 to give on-off operation.

The pressure regulator valve 15 includes a diaphragm 27 which is positioned over a chamber 28 in body member 12 and is secured between body member 12 and an additional body member 29 by screws or other appropriate means at its periphery. A pair of circular, centrally apertured plates 31 and 32, having diameters somewhat smaller than that of diaphragm 27, are placed on either side of diaphragm 27 to rigidize the center portion thereof. A threaded pin 33 extends through the aperture in plates 31 and 32 and through a similar aperture in diaphragm 27 and is secured thereto by nuts 34 and 35 on either side of the plates. Pin 33 extends through an aperture 36 in valve body portion 12 and into a chamber 37 also formed in body member 12. A valve 38, disposed in chamber 37, is attached to the end of pin 33 and is adapted to cooperate with the aperture 36 to provide a valve action therewith.

Assuming that each of the valves in manifold valve 10 are in an open position, gas enters an inlet 41 in the side of valve body member 11 and flows into a chamber 42 in plug valve 13, through a passage 43 and into chamber 37. The fluid then passes through aperture 36 into chamber 28, through valve seat 26 of the thermostatic valve and out of the valve through a passage 44 and through appropriate piping (not shown) to a burner. The manifold valve and the individual valves contained therein, as described thus far, are all of a conventional nature and no further explanation of the plug valve or thermostatically operated valve need be given.

Attached to body member 12, by screws 45 or other appropriate means, adjacent diaphragm 27, is the additional body member 29. Body member 29 has a portion 47 which extends upwardly beyond body members 11 and 12. Inside body member 29 is formed a chamber 48 which, when the device is completely assembled, is covered by a cover member 49 which is attached by appropriate means, such as screws 52, to body member 29. Contained within chamber 48 is a coil spring 53 for loading diaphragm 27 in opposition to the pressure in chamber 28. Spring 53 is connected at one of its ends to a leg 54 of a force transmitting member 55. Force transmitting member 55 is formed from a single plate and has a central portion 56 and a short leg portion 54 extending upwardly therefrom at an angle of approximately 60° therewith and a second longer leg portion 57 extending from the opposite side thereof at an angle of approximately 60°. Member 55 is pivoted at its center portion 56 on a member 60 which is in turn attached to body member 29 by a pair of screws 61. One end of spring 53 is hooked into an aperture in leg 54 of member 55 and the longer leg portion 57 of member 55 extends upwardly and engages the end of pin 33 which is attached to the diaphragm 27.

Mounted on the rear of the manifold valve, and attached to body member 11 by screws 62, is a frame member 63. Member 63 extends upwardly above the body member 11 and near its upper end has an aperture 64 formed therein. A similar aperture 65 is formed in portion 47 of body member 29. Apertures 64 and 65 are of the same diameter and are axially alined when the valve is assembled. A rod like member 66, hereinafter referred to as a motion transmitting member, extends along the top of valve body portions 11 and 12 and is rotatably mounted in apertures 64 and 65. One end 67, of member 66 extends through aperture 65 and into chamber 48 in body member 29. An O-ring 68 is engaged between a shoulder 71 and end 67 of member 66 and the interior of portion 47 to prevent leakage therebetween. Attached to end 67 of member 66, by a screw 72 is a member 73. Member 73 has a threaded arm portion 74 which extends transversely to member 66. Threaded onto arm 74 is a thumb screw 75 which in turn pivotally carries a spring engaging member 76 which is connected to the upper end of spring 53.

Attached to the other end of member 66, is a second arm member 77 which extends transversely to member 66. Arm 77 has a threaded aperture 81 formed near its outer end. Rotatably mounted on member 66 adjacent arm 77, is a selector member 82. Selector member 82 is formed substantially in the shape of a segment of a circle and near the apex has an aperture 83 through which member 66 passes. Radially outward from aperture 83 on member 82 is an arcuate slot 84. When member 82 is mounted on member 66, segmental slot 84 coincides with aperture 81 in arm 77. A screw 85 extends through arcuate slot 84 and is threaded into aperture 81 to allow angular adjustment between member 82 and arm 77, thereby adjusting member 82 with respect to motion transmitting member 66. A wire friction clutch 86 which is formed of spring steel, has a hooked end 86a which encircles and engages member 66 to add friction to the system when the member 66 is rotated counter-clockwise as viewed in FIGURE 2 to help hold the spring adjustment. The other end of member 86 is held in place by being operably attached to frame member 63. This may be accomplished, for example, by a hook 86b, on member 86, extending through an aperture in frame 63. At the outer end, and in one corner, of selector member 82, is an aperture 87 which accepts the hooked end of a Bowden wire 88 which, in turn, extends upwardly from the valve to some position on the water heater (not shown) and terminates in a manually operable adjustment mechanism (not shown) which can be moved to cause movement of the Bowden wire and consequently to cause angular movement of selector member 82 and motion transmitting member 66.

Along the outer periphery of selector member 82 is a series of numbers 91 which co-act with an indicating mark 92 on frame 63 to give an indication of the angular position of motion transmitting member 66. As will be explained hereinafter, the numbers which in this embodiment of the invention, are numbers 30 through 50, refer to the rate of flow of fuel gas through the valve, and correspond to heat rates at the burner of 30,000 through 50,000 B.t.u.'s per hour. Rotation of member 82 from the 30,000 B.t.u. per hour indication to the 50,000 B.t.u. per hour indication corresponds to a rotation of about 45° and since member 82 is attached to motion transmitting member 66, rotation of member 82 results in a corresponding rotation of member 66. Rotation of selector member 82 is limited by the coaction of a pair of abutment portions 93 and 94 on the outer periphery of member 82 and adjacent opposite edges thereof and an abutment 95 on the adjacent upstanding portion of frame member 63.

As best seen in FIGURE 2, when selector member 82 is in a position corresponding to 50,000 B.t.u.'s per hour, arm member 74 is at a substantially horizontal position and at the same time forms nearly a right angle with the axis of spring 53. This position is shown schematically in FIGURE 5–A. FIGURE 5–B shows the position of arm member 74 when selector member 82 is rotated to the 30,000 B.t.u. per hour position. It will be seen that in this position arm member 74 forms an acute angle, about 45°, with the horizontal.

As can be seen from the foregoing, the desired heat rate can be obtained at the burner which is controlled by this valve by operating the Bowden wire 88 to move selector member 82 to a position which will indicate the desired flow through the valve. In so doing, motion transmitting member 66 is also positioned as is arm 74 and spring engaging member 76. This applies the proper tension on spring 53 to load diaphragm 27 so that the diaphragm operates in response to a pressure in chamber 28 which corresponds to the desired flow rate through the valve. When selector member 82 is rotated to a different position, member 66 and arm member 74 are also rotated to change the tension on spring 53 and thus place a different loading on diaphragm 27 to cause it to maintain a pressure corresponding to the new desired flow rate through the valve.

Calibration

As was pointed out previously herein, the problem heretofore in control devices of this type was the calibration of the device. The present invention overcomes the problem of calibration. Calibration in this device is accomplished in a manner which will be explained hereafter. Spring member 53 is designed to have a length and a spring constant such that when arm member 74 is in a substantially horizontal position and thus substantially perpendicular to the axis of spring 53, the load on diaphragm 27 is such that valve 38 will be operated to maintain a flow through the valve which corresponds to a heat rate of approximately 50,000 B.t.u.'s per hour.

In calibrating the valve, screw 85 which extends through arcuate slot 84 and is threaded into aperture 81 in arm 77 is loosened. Motion transmitting member 66 is then rotated to a position where a flow rate corresponding to 50,000 B.t.u.'s per hour is obtained through the valve. At this position, arm member 74 is substantially horizontal. When this condition is obtained, selector member 82 is rotated with respect to motion transmitting member 66 to a point where the indicator indicates 50,000 B.t.u.'s per hour. Screw member 85 is then tightened to fix member 82 with respect to motion transmitting member 66. Selector member 82 is then rotated approximately 45° to the point where a flow rate of 30,000 B.t.u.'s per hour is indicated. This rotation also causes rotation of arm member 74 to a position substantially 45° with the horizontal. Due to this rotation of arm member 74, the tension in spring 53 is lessened so that the flow through the valve is maintained in the vicinity of 30,000 B.t.u.'s per hour. Thereafter final calibration is obtained by moving thumb screw 75 and thus spring engaging member 76 along the axis of arm member 74 until a flow rate exactly corresponding to 30,000 B.t.u.'s per hour is obtained through the valve.

It would appear that thus moving thumb screw 75 and spring engaging member 76 with respect to arm 74 would affect the calibration of the valve when it is again returned to the 50,000 B.t.u. per hour position. However, it should be pointed out that the effect of this changing of position of spring engaging member 76 with respect to arm 74 has a negligible effect on the calibration at this point. The reason that this is true will be better understood by referring to FIGURES 5-A and 5-B in conjunction with the following explanation. With regard to this calibration, it should be kept in mind that the distance which member 76 is moved with respect to arm 74, indicated as a distance Y in FIGURES 5-A and 5-B, is always very small with respect to the length of the spring and has been somewhat exaggerated in these figures for clarity. Referring to FIGURE 5-B, the solid line portion shows member 76 in the position which it occupies when the initial calibration at the 50,000 B.t.u. per hour position is made, and the dotted portion shows member 76 after being moved a distance Y in order to obtain the correct calibration at the 30,000 B.t.u. per hour position. As was pointed out previously, when selector member 82 is at the 30,000 B.t.u. per hour setting, arm member 74 makes an angle with the horizontal of approximately 45° and therefore the angle between arm member 74 and the axis of the spring, before the second calibration is made, is an obtuse angle somewhat greater than 135°. This angle is shown in FIGURE 5-B as $\beta$. Prior to the second calibration, when arm 74 is in the 30,000 B.t.u. per hour position, spring 53 has a length of L. After thumb screw 76 has been moved a distance Y, spring 53 has a length of L', which is somewhat longer than the length L. From the law of cosines, the length L' is seen to be equal to the $$\sqrt{L^2 + Y^2 - 2 \cdot L \cdot Y \cdot \cos \beta}$$

Since $\beta$ is an angle between 90° and 180°, the cosine thereof is a negative number and it can be seen that the term $2 \cdot L \cdot Y \cdot \cos \beta$ then becomes negative and the last term under the radical becomes positive. The length L' is therefore considerably greater than the length L. Thus the movement of the member 76 along arm 74 for the short distance Y makes a substantial difference in the length of spring 53 and consequently in the tension applied thereto.

When arm member 74 is returned to the position shown in FIGURE 5-A, the effect of the movement of member 76 the distance Y along arm 74 is practically negligible. This can be seen by considering that in this position, spring 53 had a length M prior to the movement of member 76 during the second calibration. Now, after the movement of member 76 through a distance Y, spring 53 assumes a length M' which is equal to the $$\sqrt{M^2 + Y^2}$$

However, remembering that Y is very small with respect to the length M, the difference between M' and M is, for all practical purposes, negligible.

In view of the foregoing, it is seen that the valve of the present invention can be calibrated very quickly and easily in only two steps. The first step consists of setting arm member 74 at the 50,000 B.t.u. per hour position, where it is substantially perpendicular to spring member 53, adjusting selector member 82 to a point which indicates this rate of flow and securing member 82 to motion transmitting member 66. The second step consists of rotating the selector device to the 30,000 B.t.u. per hour position, and then adjusting member 76 along arm 74 to a position where the valve operates to maintain a rate of flow which corresponds to a heat rate of 30,000 B.t.u.'s per hour.

While I have described and shown my invention for use in connection with a fluid pressure regulator, it may obviously find application in many types of diaphragm operated, pressure responsive control devices where it is desired to adjust the operating point of the device between two limiting operating pressure conditions. Therefore, I do not wish to limit the invention to the preferred embodiment shown herein, but intend that it should be limited only by the scope of the appended claims.

I claim:

1. Apparatus for variably loading the diaphragm operator of a fluid pressure responsive control device to selectively determine the operating point of the device comprising: a spring member operably connected to the diaphragm for loading the diaphragm; a motion transmitting member rotatably mounted on the body of the device; means adjustably associated with said motion transmitting member and adapted to limit the angular movement of said motion transmitting member to movement between two limiting positions; an arm member mounted on said motion transmitting member, said arm member being substantially perpendicular to the axis of said spring when said motion transmitting member is in one of said limiting positions and forming an acute angle with the axis of said spring when said motion transmitting member is in the other of said limiting positions; and a spring engaging member mounted on said arm member and movable along the axis thereof, said spring engaging member being operably connected to one end of said spring.

2. The apparatus of claim 1 in combination with friction means associated with said motion transmitting member to increase the friction on said member only in the direction in which it tends to rotate due to the bias of said spring.

3. Apparatus for selectively loading the operating diaphragm of a pressure responsive control device comprising: a spring for loading the diaphragm, said spring having one end adapted to be operably connected to the diaphragm; a rotatably mounted motion transmitting member; an arm member on said motion transmitting member and adjustably connected to the other end of said spring; remotely located control means for selecting the rotational position of said motion transmitting member to thereby determine the tension in said spring; and friction means associated with said motion transmitting member to increase the friction on said member only in the direction in which said member tends to rotate in response to the tension of said spring.

4. Apparatus for variably loading the diaphragm operator of a fluid pressure responsive device for selecting the operating point of the device comprising: a spring operably connected to the diaphragm for loading the diaphragm in opposition to the pressure of the fluid; a motion transmitting member rotatably mounted on the body of the device; a selector member mounted on said motion transmitting member; means associated with said selector member and limiting rotational movement thereof to movement between two limiting positions, said limiting positions corresponding to first and second operating points of the device; an arm member mounted on said motion transmitting member and extending generally transversely thereto, said arm member being substantially perpendicular to the spring when said motion transmitting member is in said first position and forming an acute angle with said spring when said motion transmitting member is in said second position; calibration means for the device including means for adjusting the rotational position of said selector member with respect to said motion transmitting member, and a spring engaging member mounted on said arm member and adjustable along the axis thereof, said spring engaging member being operably connected to one end of said spring; control means for causing rotational movement of said selector member and said motion transmitting member between said two positions to place a desired tension on said spring; and means associated with said selector member to indicate the operating point of the device.

5. Apparatus for variably loading the diaphragm operator of a pressure responsive control device to render the device adjustable between maximum and minimum operating points comprising: a spring for loading the diaphragm in opposition to the pressure; force transmitting means engaging one end of said spring member and adapted to transmit force therefrom to the diaphragm; a motion transmitting member rotatably mounted on the body of the device; an arm member fixed to said motion transmitting member and extending generally transversely thereto; a selector member mounted on said motion transmitting member; means associated with said selector member for limiting angular movement thereof to movement between two positions corresponding to the maximum and minimum operating points of the device; means associated with said selector member for indicating the operating point of the control device; and calibration means for the device including means for adjusting the rotational position of said selector member on said motion transmitting member and for locking said selector member to said motion transmitting member thereafter, and a spring engaging member mounted on said arm member and adjustable along the axis thereof and engaging the other end of said spring, said spring being so constructed that said arm member is substantially perpendicular to said spring at the maximum operating point and so that said arm member forms an acute angle with said spring at the minimum operating point; said calibration means affording calibration of the device by first rotating said motion transmitting member to a position where the loading on the diaphragm causes the device to operate at the maximum operating point, by adjusting the position of said selector member with respect thereto to indicate the maximum operating point and then by locking said selector member to said motion transmitting member, by rotating said selector member and said motion transmitting member to said minimum pressure position, and by adjusting said spring engaging member along the axis of said arm member to a position where the loading of the diaphragm causes the device to operate at the minimum operating point.

References Cited in the file of this patent

UNITED STATES PATENTS

| | | |
|---|---|---|
| 1,079,904 | Perkins | Nov. 25, 1913 |
| 2,281,605 | Smith | May 5, 1942 |
| 2,356,556 | Andersson | Aug. 22, 1944 |
| 2,987,309 | Biggle | June 6, 1961 |
| 3,090,609 | Godshalk | May 21, 1963 |

FOREIGN PATENTS

| | | |
|---|---|---|
| 479,341 | Germany | July 15, 1929 |
| 583,086 | Germany | Aug. 28, 1933 |